United States Patent [19]
Tabata et al.

[11] Patent Number: 6,161,645
[45] Date of Patent: *Dec. 19, 2000

[54] CABLE STEERING DEVICE

[75] Inventors: Hiroshi Tabata; Yasuo Shimizu; Shigeki Ehara; Koichi Suyama, all of Saitama, Japan

[73] Assignee: Honda Giken Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/006,930

[22] Filed: Jan. 14, 1998

[30] Foreign Application Priority Data

Jan. 16, 1997 [JP] Japan ..................................... 9-005346

[51] Int. Cl.[7] ...................................................... B62D 1/00
[52] U.S. Cl. ........................................... 180/444; 180/443
[58] Field of Search ..................................... 180/400, 417, 180/425, 430, 443, 444, 446; 74/501.6, 502, 502.4; 280/771, 774

[56] References Cited

U.S. PATENT DOCUMENTS

| | | | |
|---|---|---|---|
| 3,747,428 | 7/1973 | Waner et al. | 280/771 |
| 4,023,434 | 5/1977 | Axelsson | 280/771 |
| 4,183,421 | 1/1980 | Brown | 180/430 |
| 4,449,420 | 5/1984 | Baba | 280/774 |
| 5,000,278 | 3/1991 | Morishita | 180/446 |
| 5,598,897 | 2/1997 | Sugiura | 180/417 |
| 5,893,426 | 4/1999 | Shimizu et al. | 180/400 |
| 5,924,517 | 7/1999 | Sugiura | 180/417 |
| 5,924,520 | 7/1999 | Ehara et al. | 180/444 |
| 5,951,031 | 9/1999 | Shimizu et al. | 180/425 |

FOREIGN PATENT DOCUMENTS 8-2431  1/1996  Japan .

*Primary Examiner*—Daniel G. DePumpo
*Assistant Examiner*—Michael Cuff
*Attorney, Agent, or Firm*—Armstrong, Westerman, Hattori, McLeland & Naughton

[57] ABSTRACT

A cable steering device in which the steering torque of a steering wheel is transmitted to wheels by a driven pulley provided in a driven pulley housing, cables, a follower pulley provided in a follower pulley housing and a gear box, and a power steering motor for assisting in the generation of the steering torque is provided in the follower pulley housing and not in the gear box.

5 Claims, 9 Drawing Sheets

CABLE STEERING DEVICE

BACKGROUND OF THE INVENTION

1. Field of the Invention

This invention relates to a cable steering device in which a steering wheel and a gear box are connected to each other by flexible cables, such as Bowden cables.

2. Description of the Related Art

In a conventional steering device for a vehicle, a lower end of a steering shaft having a steering wheel at an upper end thereof is connected to a gear box so that a steering torque inputted to the steering wheel is transmitted to a rack and pinion mechanism provided in the gear box via the steering shaft.

However, when the steering wheel and the gear box are connected to each other using the steering shaft, it is difficult to freely select a position of the steering wheel relative to the gear box. Therefore, the degree of freedom of designing the apparatus is greatly restricted and further, the gear box cannot be commonly used in both a right-hand steered vehicle and left-hand steered vehicle. In addition, the vibration inputted from the road surface to tires and the vibration of an engine are inputted to the steering wheel via the steering shaft, so that such vibrations detract from calmness in the interior of the vehicle and riding comfort.

Therefore, a cable steering device employing flexible transmission means, such as Bowden cables instead of a conventional steering shaft has been proposed in Japanese Patent Application Laid-Open No. 8-2431.

When a steering device is formed in this manner, it becomes possible to freely select a position of a steering wheel relative to a gear box, and, moreover, the vibration of the gear box is rarely transmitted to the steering wheel. This solves the above-mentioned various problems.

A known electric power steering device is provided with an actuator, which comprises a power steering motor, on the outside of a gear box, and the wheels are steered by driving a steering rod housed in the gear box, by this actuator.

If a cable steering device and an electric power steering device are combined with each other with an actuator provided on a gear box, the degree of freedom of designing the electric power steering device with respect to the dimensions and shape thereof is reduced and it becomes difficult to place the electric power steering device in a narrow engine room.

SUMMARY OF THE INVENTION

The present invention has been developed in view of these facts, and is directed to improving the degree of freedom of designing a cable steering device having an electric power steering device, with respect to the dimensions and shape thereof, and enabling this apparatus to be housed more easily in a small engine room.

In the present invention, an operation of the steering wheel made by a driver is transmitted to the wheels via the driven pulley, cables, follower pulley and gear box. In the meantime, the power assist means is operated on the basis of the steering wheel operating torque detected by a steering torque detecting means, and the driver's steering wheel operating action is thereby assisted. Since the power assist means is provided in a follower pulley housing in which the follower pulley is housed, the device can be placed in an engine room more easily by miniaturizing and simplifying the gear box. Moreover, a gear box of an existing manual steering apparatus can be used as it is.

In one preferred embodiment of the invention, when the power steering motor constituting the power assist means is rotated, the driving force is transmitted from a worm mounted on the output shaft thereof to a worm wheel mounted on the follower pulley or the rotary shaft thereof, whereby the driver's steering operation is assisted.

When the power steering motor constituting the power assist means in the invention is rotated, the driving force is transmitted to the follower pulley connected directly to the output shaft of the power assist means or the rotary shaft of the follower pulley, whereby the driver's steering operation is assisted.

In another embodiment of the invention, when the power steering motor constituting the power assist means is rotated, the driving force is transmitted from a spur gear mounted on the output shaft thereof to a spur gear mounted on the follower pulley or on the rotary shaft of the follower pulley, whereby the driver's steering operation is assisted.

In still another embodiment of the invention, when the power steering motor constituting the power assist means is rotated, the driving force is transmitted from a bevel gear mounted on the output shaft thereof to a bevel gear mounted on the follower pulley or on the rotary shaft of the follower pulley, whereby the driver's steering operation is assisted.

In a further embodiment of the invention the output shaft of the power steering motor is provided in parallel with a pair of cables extending from the follower pulley, and the power steering motor is located between the two cables.

BRIEF DESCRIPTION OF THE DRAWINGS

FIGS. 1 to 3 show a first embodiment of the present invention, wherein FIG. 1 is an entire perspective view of a steering device for a vehicle;

FIG. 2 is an enlarged sectional view taken along a line 2—2 in FIG. 1; and FIG. 3 is an enlarged sectional view taken along a line 3—3 in FIG. 1.

FIGS. 4 and 5 show a second embodiment of the present invention, wherein FIG. 4 is an entire perspective view of a steering device for a vehicle of a second embodiment; and FIG. 5 is a sectional view taken along a line 5—5 in FIG. 4.

FIGS. 6 and 7 show a third embodiment of the present invention, wherein FIG. 6 is an entire perspective view of a steering device for a vehicle of a third embodiment; and FIG. 7 is a sectional view taken along a line 7—7 in FIG. 6.

FIGS. 8 and 9 show a fourth embodiment of the present invention, wherein FIG. 8 is a longitudinal sectional view of a follower pulley housing in a fourth embodiment; and FIG. 9 is a sectional view taken along a line 9—9 in FIG. 8.

DETAILED DESCRIPTION OF THE PREFERRED EMBODIMENTS

The best mode for carrying out the present invention will now be described with reference to the embodiments thereof shown in the attached drawings.

Figure 1:
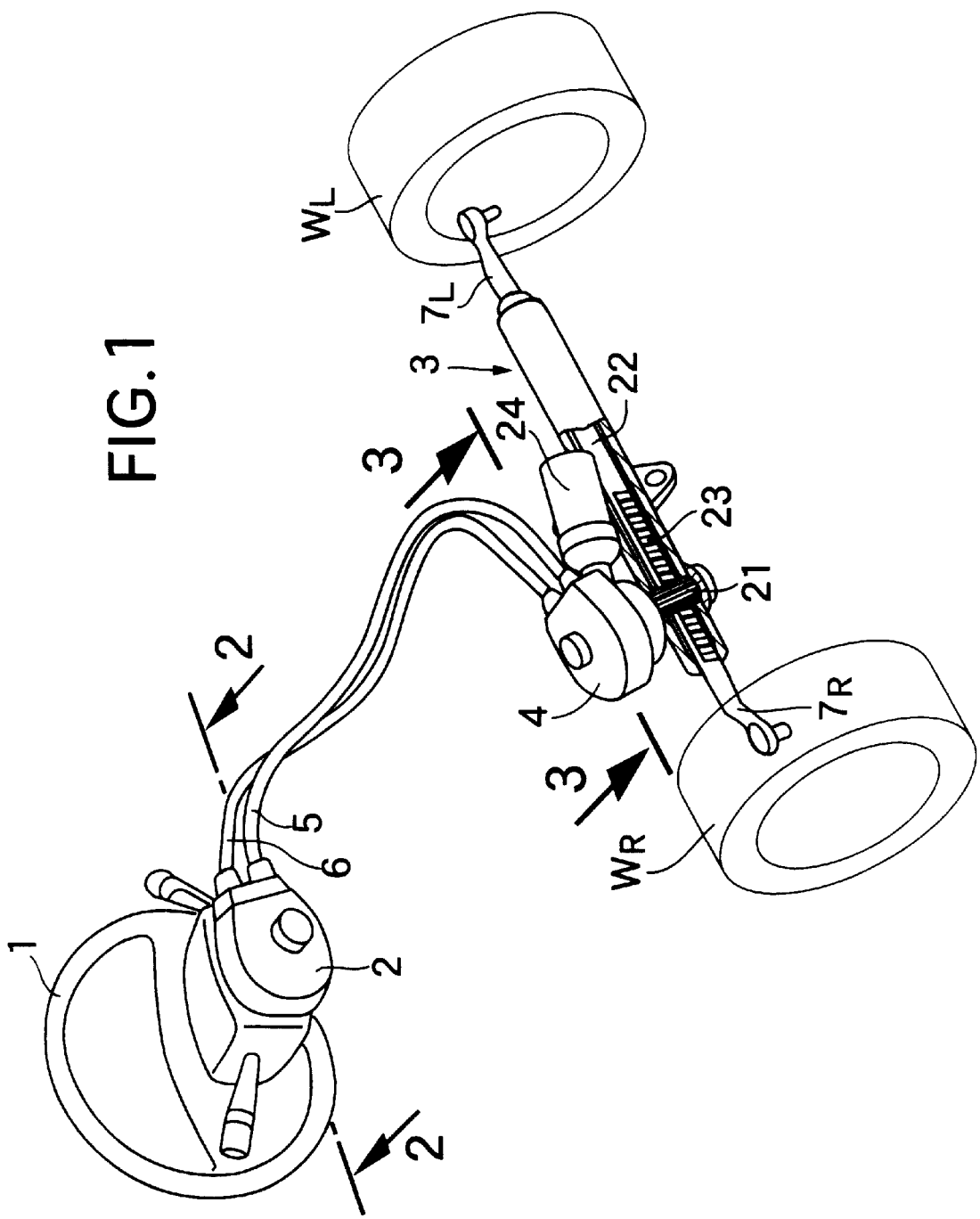

As shown in FIG. 1, a driven pulley housing 2 provided in front of a steering wheel 1 of an automobile and a follower pulley housing 4 provided above a gear box 3 are connected to each other by two Bowden cables 5, 6. The tie rods 7L, 7R extending from both end portions of the gear box 3 in leftward and rightward directions of a vehicle body are connected to knuckles (not shown) supporting left and right wheels $W_L$, $W_R$.

Figure 2:
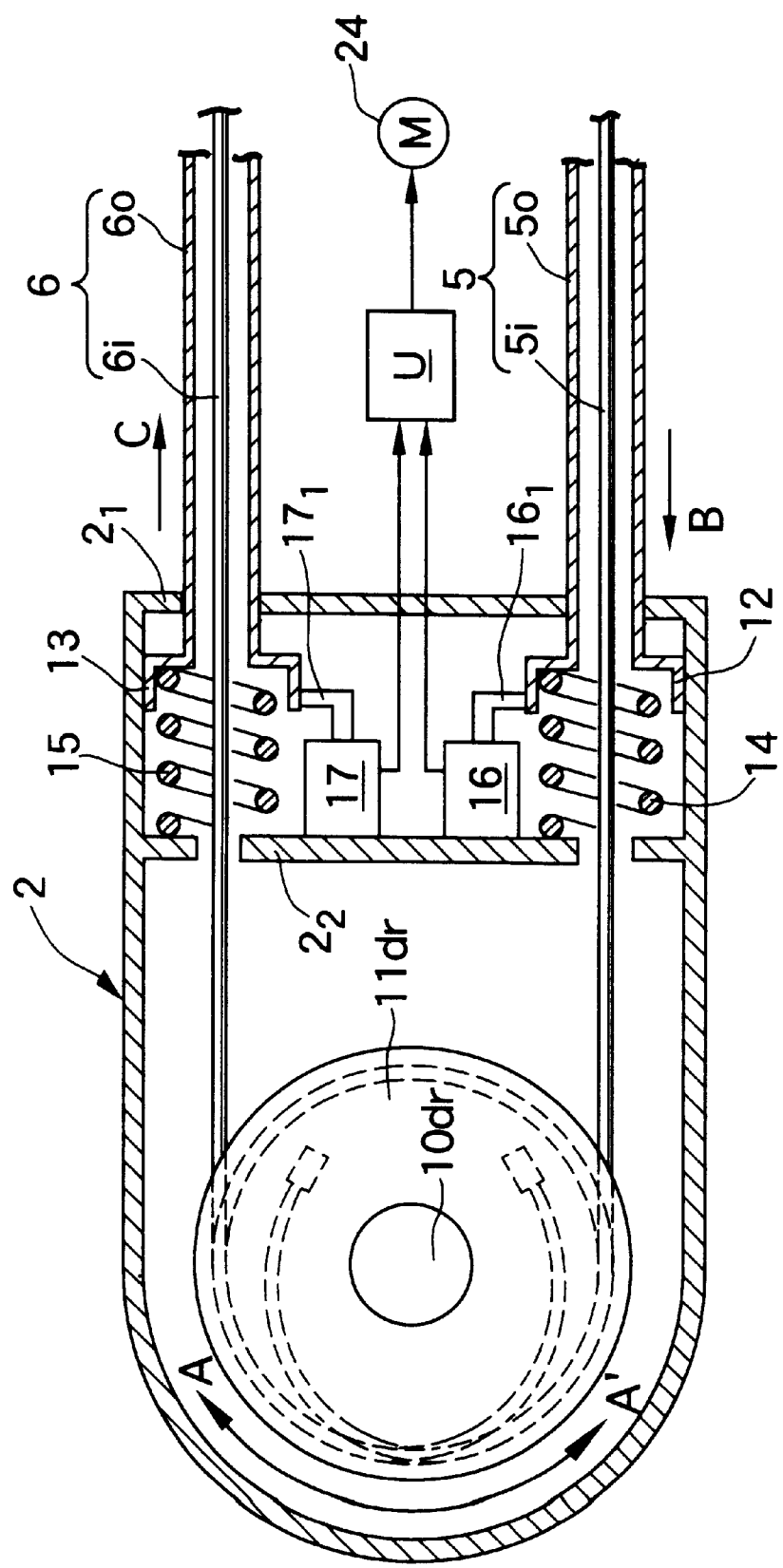

As shown in FIG. 2, a driven pulley 11*dr* is mounted fixedly on a rotary shaft 10*dr* which is supported rotatably in the driven pulley housing 2 and rotated with the steering wheel 1. The two Bowden cables 5, 6 comprise outer tubes 5*o*, 6*o*, and inner cables 5*i*, 6*i* housed slidably in the interior of the outer tubes, and one end portion of each of the inner cables 5*i*, 6*i* is fixed by being wound a plurality of times along a helical pulley groove formed in an outer circumference of the driven pulley 11*dr*, one end portion of each of the outer tubes 5*o*, 6*o* being supported slidably in the driven pulley housing 2.

Spring seats 12, 13 are formed by enlarging the diameter of one end portion of each of the outer tubes 5*o*, 6*o* and positioned between an end wall $2_1$ and an intermediate wall $2_2$ formed in the driven pulley housing 2. Springs 14, 15 are compressed between the intermediate wall $2_2$ of the driven pulley housing 2 and the spring seats 12, 13 urge the two outer tubes 5*o*, 6*o* in the direction in which the outer tubes 5*o*, 6*o* are pushed out of the driven pulley housing 2. Accordingly, the spring seats 12, 13 of the two outer tubes 5*o*, 6*o* are movable in the longitudinal direction (lengthwise direction of the Bowden cables 5, 6) in accordance with the expansion and contraction of the springs 14, 15. A pair of differential transformers 16, 17 are provided on the intermediate wall $2_2$ of the driven pulley housing 2 as steering torque detecting means. The detecting elements $16_1$, $17_1$ of these differential transformers 16, 17 are connected to the spring seats 12, 13 respectively.

When the rotary shaft 10*dr* is rotated in a direction of an arrow A by operating the steering wheel 1, tension of the inner cable 5*i* increases to cause the outer tube 5*o* to be drawn in a direction of an arrow B against the spring 14, and the spring seat 12 of the outer tube 5*o* moves the detecting element $16_1$ of the differential transformer 16 in the direction of the arrow B. Since tension of the inner cable 6*i* decreases, the outer tube 6*o* is pressed in a direction of an arrow C due to a resilient force of the spring 15, so that the spring seat 13 of the outer tube 6*o* moves the detecting element $17_1$ of the differential transformer 17 in the direction of the arrow C.

The steering torque inputted to the steering wheel 1 is proportional to a tension difference between the two inner cables 5*i*, 6*i*, and a relative amount of movement of the two outer tubes 5*o*, 6*o* is proportional to this tension difference. Accordingly, the steering torque can be determined by detecting the relative amount of movement of the two outer tubes 5*o*, 6*o* by the differential transformers 16, 17. The steering torque thus detected is arithmetically processed with other control signals in an electronic control unit U. On the basis of the results, the feedback of the steering assist torque generated by a power steering motor 24 which will be described later is controlled so that the tension difference between the inner cables 5*i*, 6*i*, i.e. the relative amount of movement of the outer tubes 5*o*, 6*o* becomes substantially constant.

When the steering wheel 1 is rotated in the direction of an arrow A' in FIG. 2, the steering torque of the steering wheel 1 can also be detected in the same manner as in the case where the steering wheel 1 is rotated in the mentioned direction of the arrow A.

Figure 3:
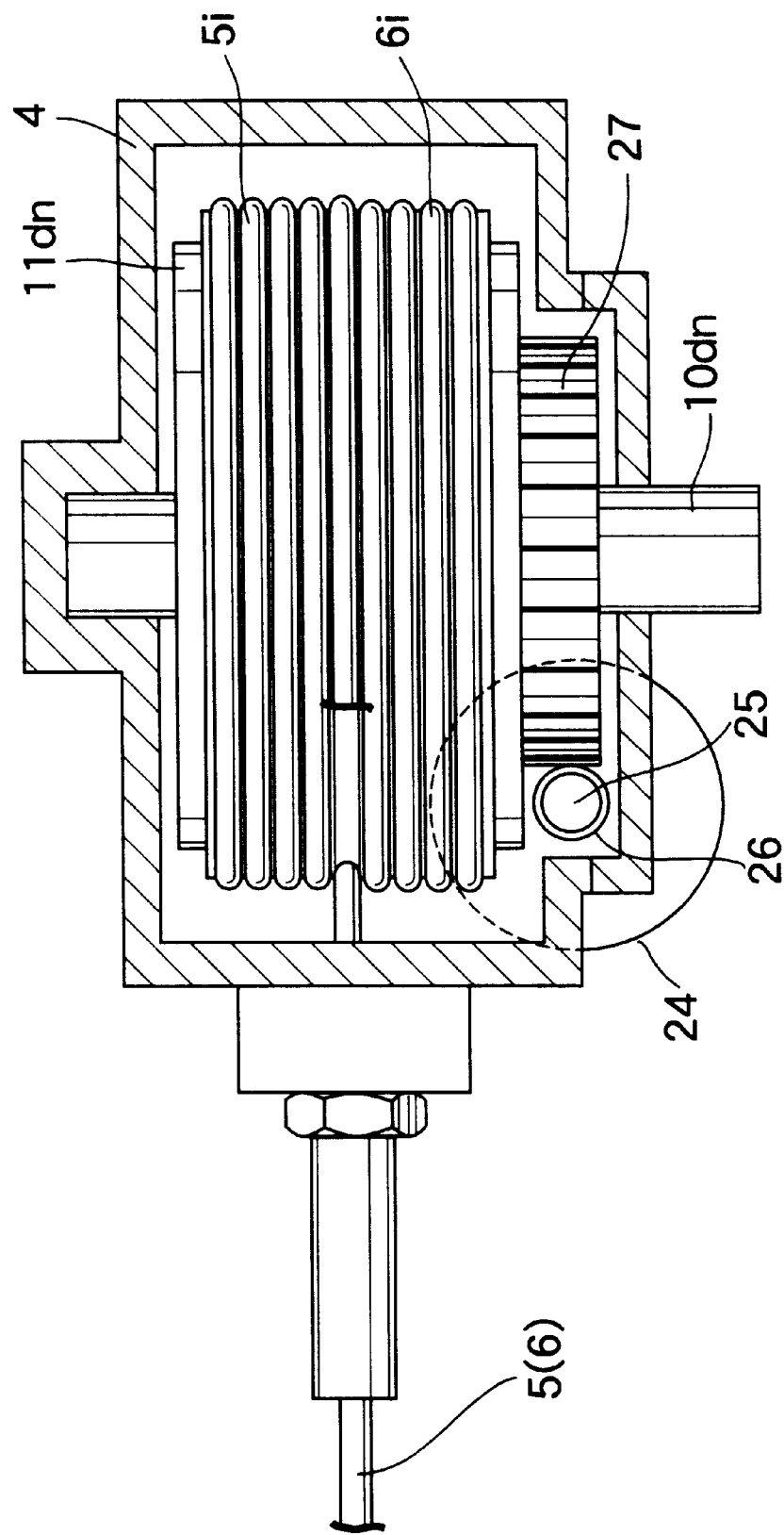

As shown in FIGS. 1 and 3, a follower pulley 11*dn* is mounted fixedly on a rotary shaft 10*dn* supported rotatably in the follower pulley housing 4, and the other end portions of the two inner cables 5*i*, 6*i* are fixed by being wound a plurality of times along a helical pulley groove formed in an outer circumference of the follower pulley 11*dn*. The other end portions of the outer tubes 5*o*, 6*o* for the two Bowden cables 5, 6 are fixed to the follower pulley housing The rotary shaft 10*dn*, which projects from the follower pulley housing 4 into the interior of the gear box 3, is mounted at a free end portion thereof with a pinion 21, which is meshed with a rack 23 formed on a steering rod 22 supported in the interior of the gear box 3 so that the steering rod can be laterally moved.

The power steering motor 24 is supported on the follower pulley housing 4, in which a worm 26 provided on an output shaft 25 is meshed with a worm wheel 27 mounted on the rotary shaft 10*dn*. Therefore, a torque of the power steering motor 24 is transmitted to the rotary shaft 10*dn* via the worm 26 and the worm wheel 27.

The operation of the embodiment of the present invention having the above-described construction will now be described.

When the steering wheel 1 is operated so as to turn the vehicle, the rotary shaft 10*dr* in FIG. 2 is rotated with the driven pulley 11*dr*. As a result, one inner cable 5*i*, 6*i* of the Bowden cables 5, 6 is drawn, and the other inner cable 5*i*, 6*i* is slackened. Consequently, the rotation of the driven pulley 11*dr* is transmitted to the follower pulley 11*dn* to cause the rotary shaft 10*dn* to rotate, and to transmit the steering torque to the wheels $W_L$, $W_R$ via the pinion 21, rack 23 and steering rod 22 in the gear box 3.

When the differential transformers 16, 17 detect the steering torque applied to the steering wheel 1, the power steering motor 24 generates torque in accordance with the steering torque. Consequently, the rotary shaft 10*dn* is rotated via the worm 26 and worm wheel 27, to assist the driver's steering wheel operating action. The worm gear comprising the worm 26 and worm wheel 27 can take a large reduction ratio, so that a small output power steering motor 24 can produce a sufficiently large steering assist force.

Since the power steering motor 24 is provided in the follower pulley housing 4, it becomes unnecessary to provide a power steering motor in the gear box 3. This improves the degree of freedom in designing the inside of the engine room by reducing the dimensions and simplifying the construction of the gear box 3. Moreover, a gear box for a manual steering device can be used as it is for the device according to present invention to contribute to the reduction of the cost.

Figure 4:
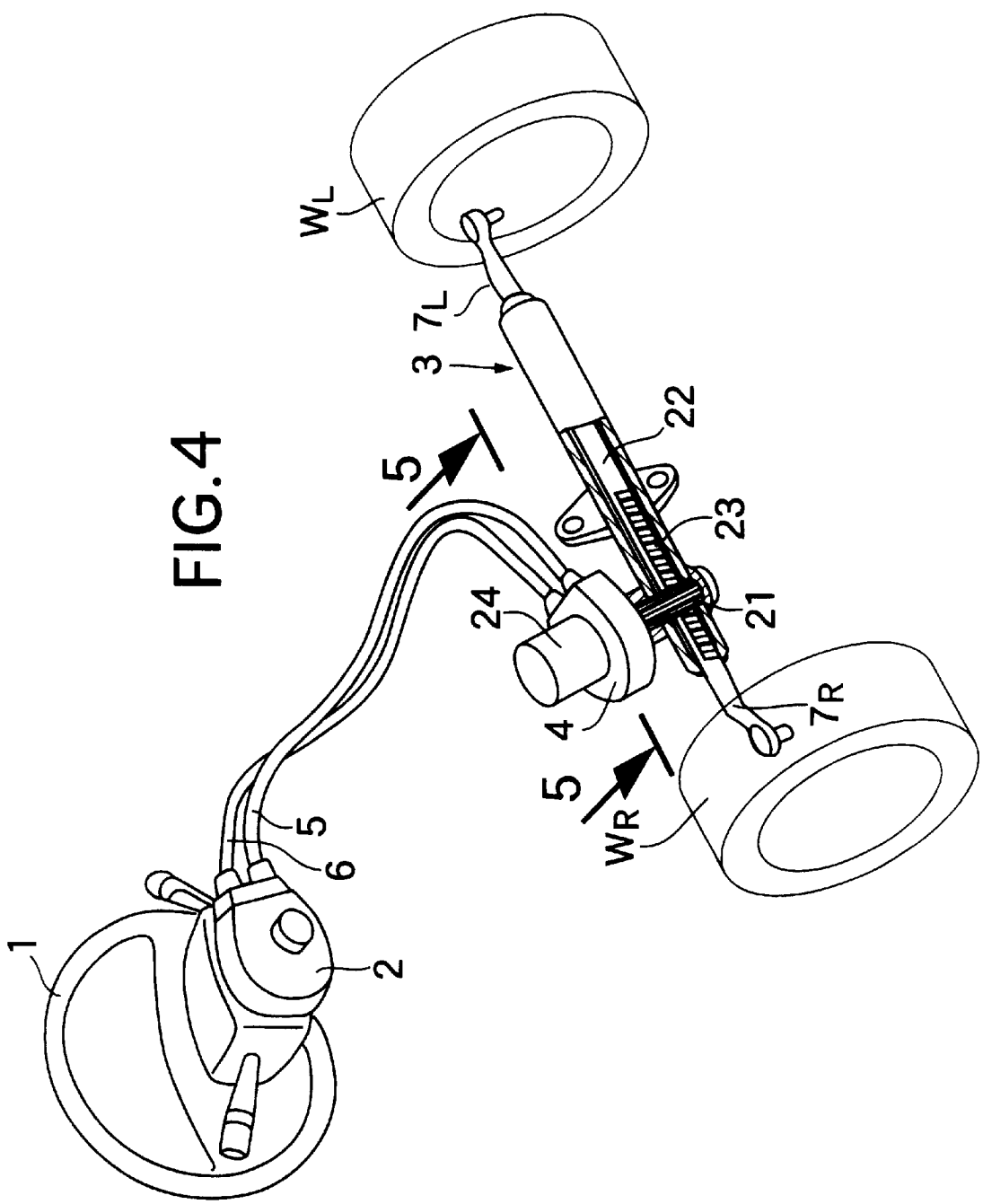
Figure 5:
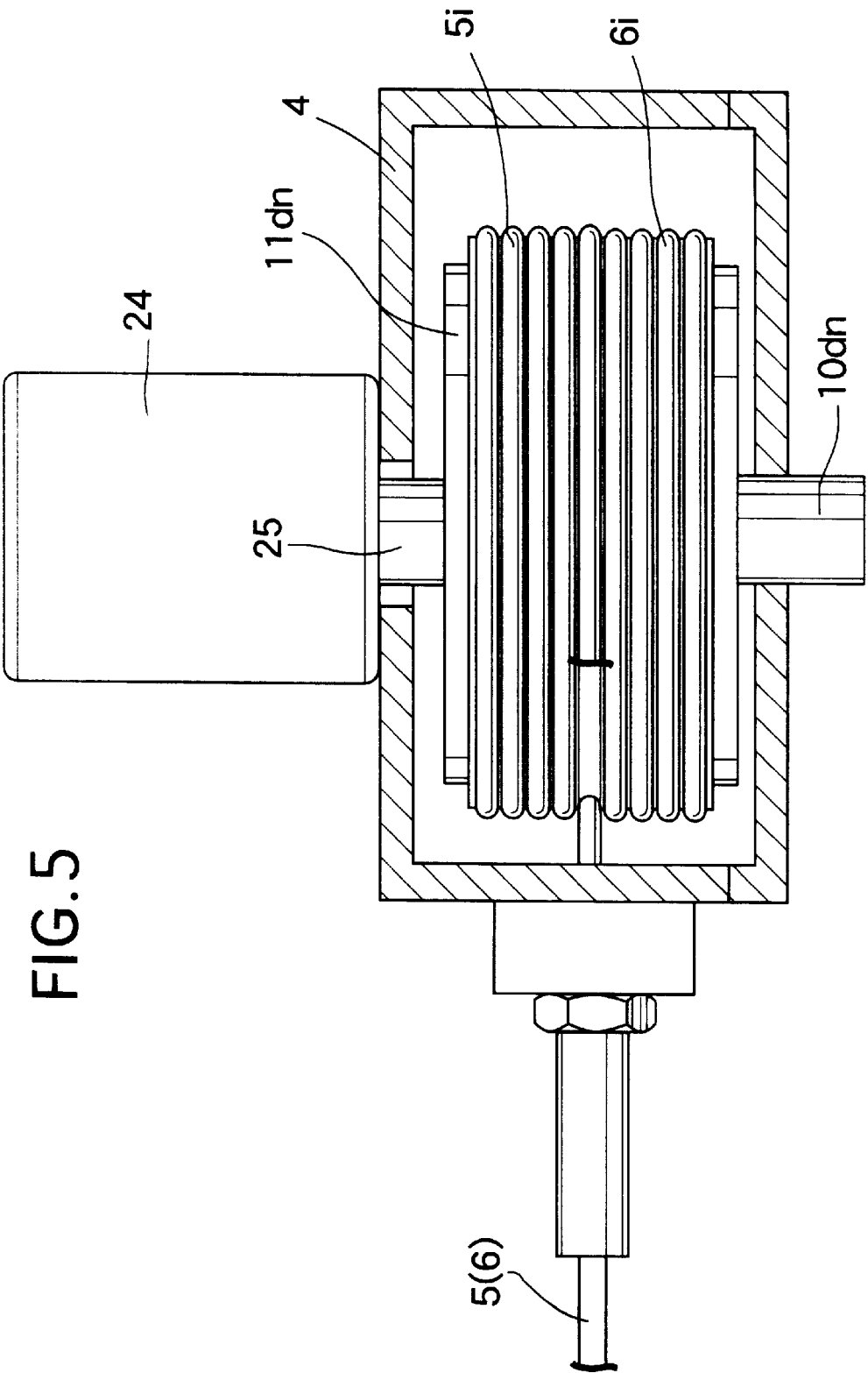

A second embodiment of the present invention will now be described with reference to FIGS. 4 and 5.

In the second embodiment, the output shaft 25 of the power steering motor 24 is connected directly to the rotary shaft 10*dn* of the follower pulley 11*dn*, and the worm 26 and worm wheel 27 in the first embodiment are omitted. Accordingly, the number of parts can be reduced.

Figure 6:
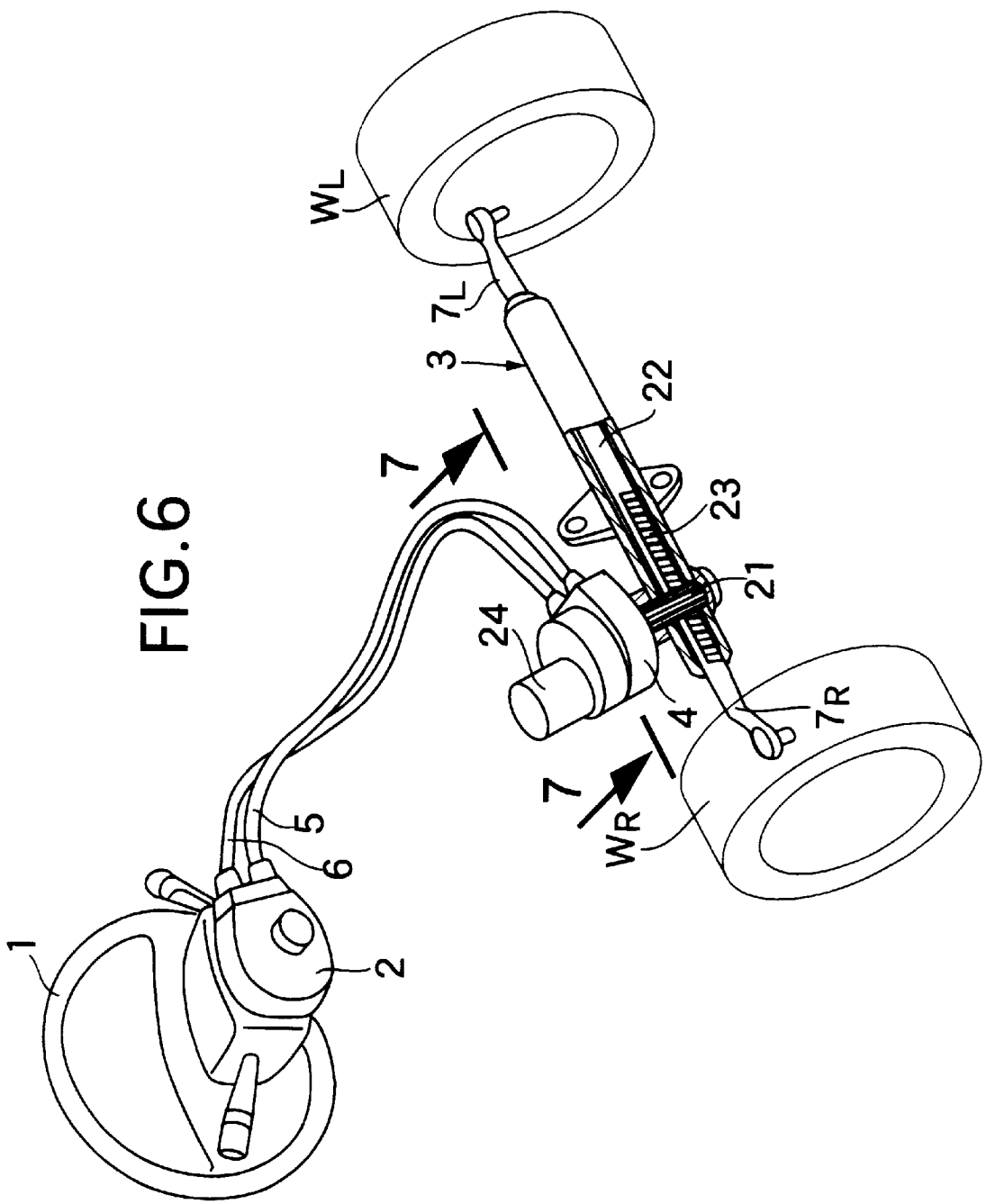
Figure 7:
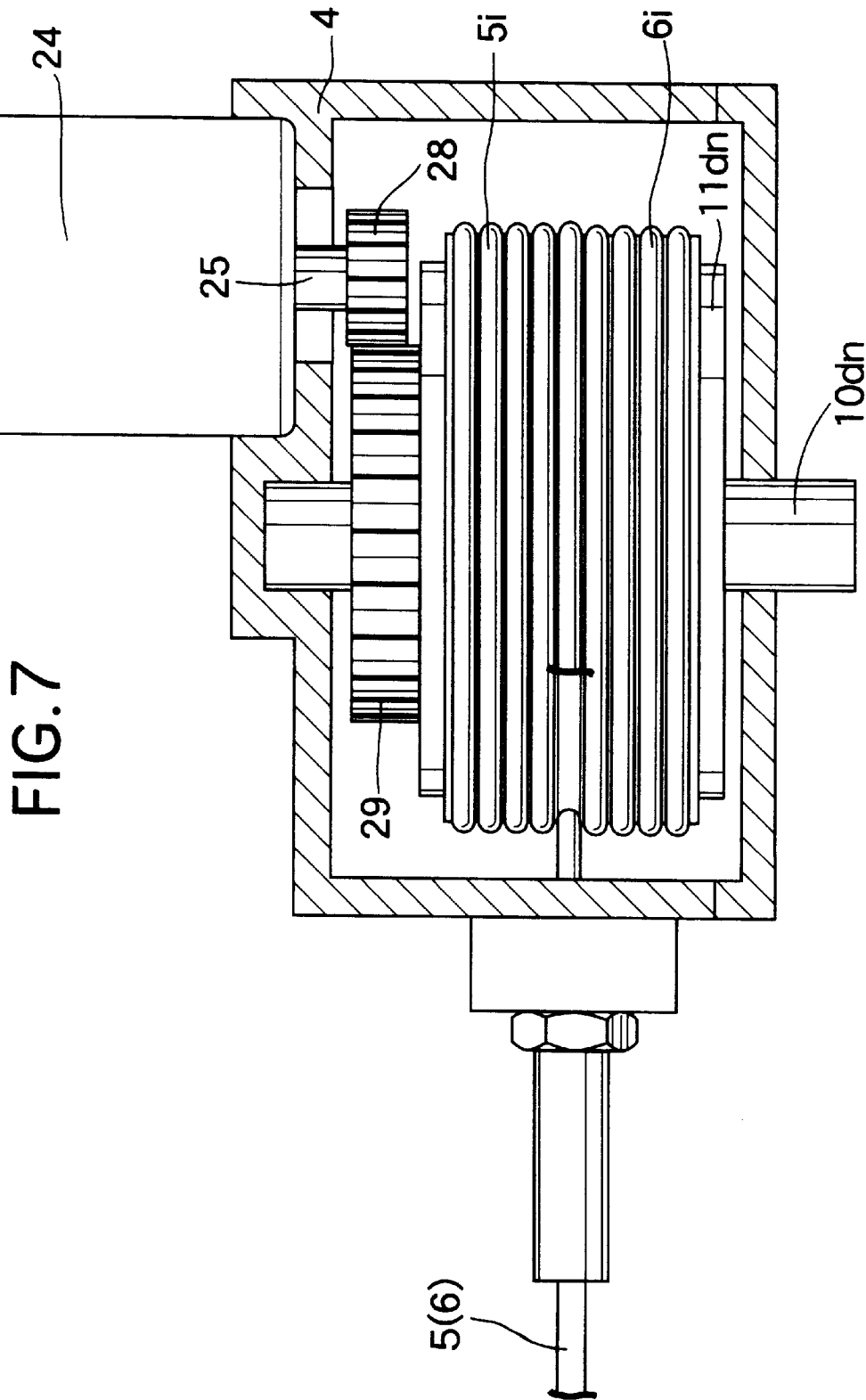

A third embodiment of the present invention will now be described with reference to FIGS. 6 and 7.

In the third embodiment, the output shaft 25 of the power steering motor 24 is provided in parallel with the rotary shaft 10*dn* of the follower pulley 11*dn*, and the small-diameter spur gear 28 mounted on this output shaft 25 is meshed with a large-diameter spur gear 29 mounted on the rotary shaft 10*dn* of the follower pulley 11*dn*. The cost of the device of this embodiment is less than that of the first embodiment in which a worm gear is used, and, moreover, the power transmission efficiency of the device of this embodiment is higher.

Figure 8:
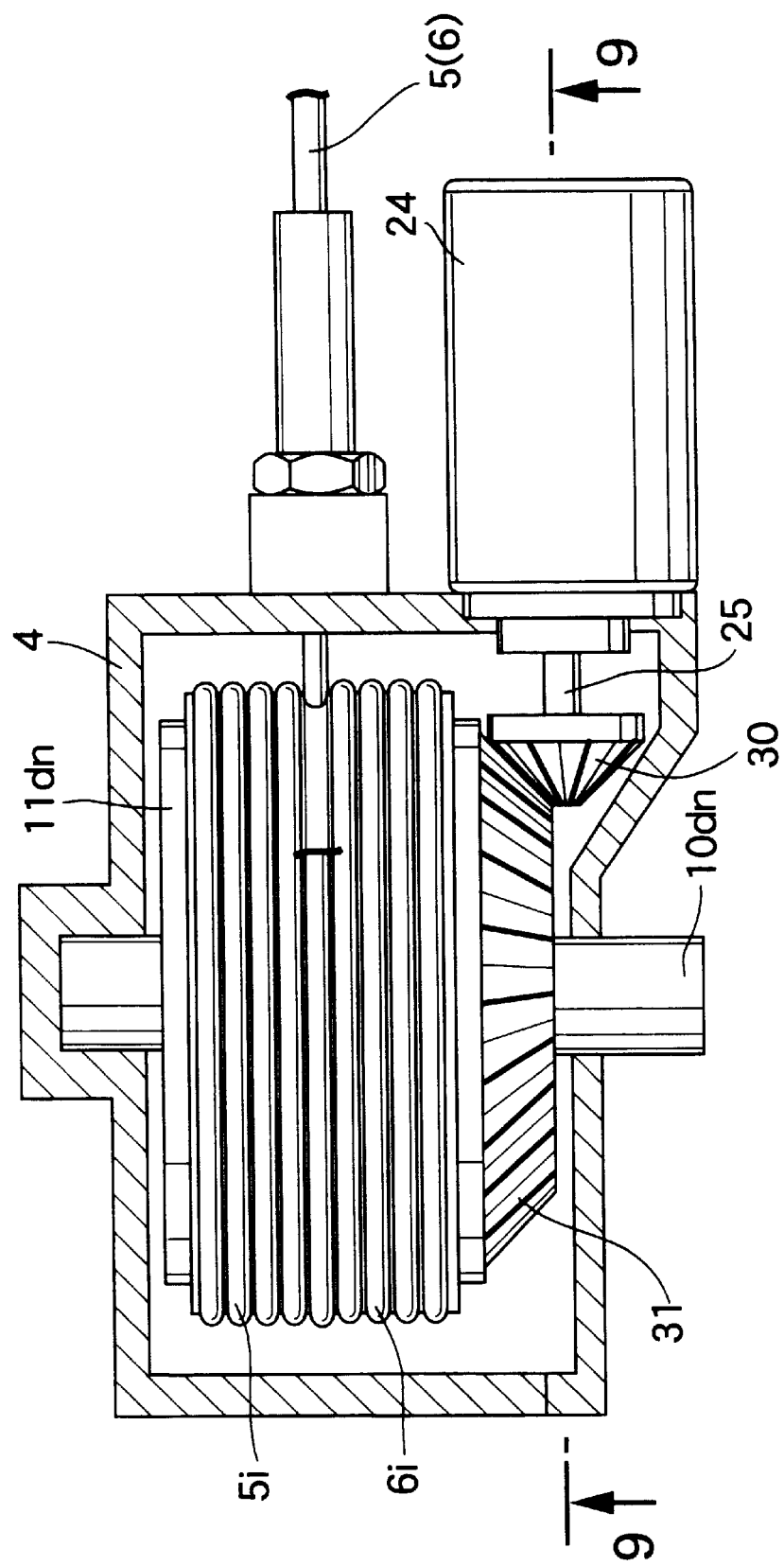
Figure 9:
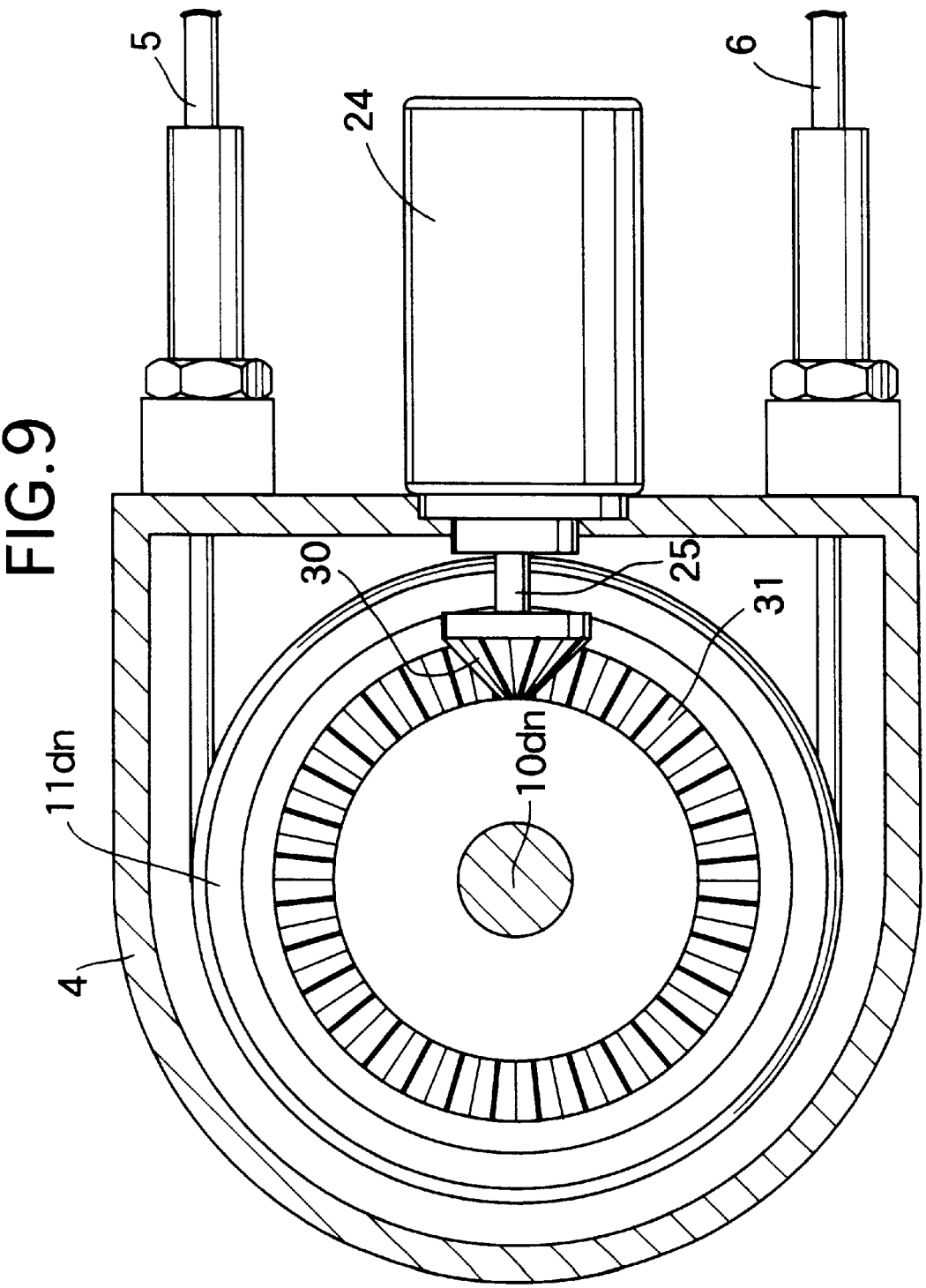

A fourth embodiment of the present invention will now be described with reference to FIGS. 8 and 9.

In the fourth embodiment, the output shaft 25 of the power steering motor 24 is provided at right angles to the rotary shaft 10dn of the follower pulley 11dn, and a small-diameter bevel gear 30 mounted on this output shaft 25 is meshed with a large-diameter bevel gear 31 mounted on the rotary shaft 10dn of the follower pulley 11dn. The power steering motor 24 is disposed (refer to FIG. 9) between a pair of Bowden cables 5, 6 extending from the follower pulley 11dn, as viewed in the axial direction of the axis of the rotary shaft 10dn of the follower pulley 11dn. Since the bevel gears 30, 31 are thus used, the degree of freedom of designing the device can be improved by crossing at an arbitrary angle the output shaft 25 of the power steering motor 24 and the rotary shaft 10dn of the follower pulley 11dn. Moreover, the power steering motor 24 can be located compactly in a dead space between the two Bowden cables 5, 6.

As described in the first to fourth embodiments, in which the power steering motor 24 is provided in an arbitrary posture in an arbitrary position in the follower pulley housing 4, the degree of freedom of designing the power steering device is improved, and it becomes easier to arrange parts in the interior of the engine room.

In the embodiments of the present invention described in detail above, various changes in the design thereof which do not depart from the gist of the present invention may be made. For example, in the first embodiment, the worm wheel 27 may be provided on the follower pulley 11dn instead of being mounted on the rotary shaft 10dn. In the second embodiment, the output shaft 25 of the power steering motor 24 may be connected directly to the follower pulley 11dn instead of being connected directly to the rotary shaft 10dn. In the third embodiment, the large-diameter spur gear 29 may be provided on the follower pulley 11dn instead of being mounted on the rotary shaft 10dn. In the fourth embodiment, the large-diameter bevel gear 31 may be provided on the follower pulley 11dn instead of being mounted on the rotary shaft 10dn.

According to the present invention as described above, the power assist means is provided in the follower pulley housing in which the follower pulley is housed, and, therefore, it is not necessary to provide the power assist means in the gear box. Accordingly, accommodation of the gear box in the engine room can be done easily by miniaturizing and simplifying the gear box. Moreover, the gear box in an existing manual steering apparatus can be used as it is.

According to one embodiment of the invention, the power assist means comprises a power steering motor, and a worm mounted on the output shaft of the power steering motor is meshed with a worm wheel mounted on the follower pulley or the rotary shaft of the follower pulley. Therefore, the driving force of the power steering motor compactly integrated in the follower pulley housing can be transmitted reliably to the gear box. Moreover, the power steering motor can be miniaturized owing to the utilization of a worm gear of a large reduction ratio.

According to a further embodiment of the invention, the power assist means comprises a power steering motor, the output shaft of which is connected directly to the follower pulley or the rotary shaft of the follower pulley. Therefore, the driving force of the power steering motor compactly integrated in the follower pulley housing can be transmitted reliably to the gear box. Moreover, since a separate gear is not required, the number of parts decreases.

According to another embodiment of the invention the power assist means comprises a power steering motor, and a spur gear mounted on the output shaft of the power steering motor is meshed with a spur gear mounted on the follower pulley or the rotary shaft of the follower pulley. Therefore, the driving force of the power steering motor compactly integrated in the follower pulley housing can be transmitted reliably to the gear box. Moreover, the cost can be reduced owing to the employment of an inexpensive spur gear set.

According to a still further embodiment of the invention, the power assist means comprises a power steering motor, and a bevel gear mounted on the output shaft of the power steering motor is meshed with a bevel gear mounted on the follower pulley or the rotary shaft of the follower pulley. Therefore, the driving force of the power steering motor compactly integrated in the follower pulley housing can be transmitted reliably to the gear box. Moreover the output shaft of the power steering motor and the rotary shaft of the follower pulley may be arranged in an arbitrary direction, so that the degree of freedom of determining the layout of the parts of the device can be increased.

According to a still further embodiment of the invention, the power steering motor is disposed between a pair of cables extending from the follower pulley, as viewed in a plane normal to the axis of the rotary shaft of the follower pulley, so that the follower pulley housing, power steering motor and cables can be compactly arranged.

What is claimed is:

1. A cable steering device for a vehicle, comprising:

a driven pulley connected to a steering wheel and capable of rotating, a gear box operative for turning vehicle wheels, a follower pulley connected to said gear box and capable of rotating, a housing for enclosing said follower pulley, a pair of cables connecting said driven pulley and said follower pulley together, said cables transmitting steering torque inputted to said steering wheel from said driven pulley to said follower pulley, means for detecting the steering torque inputted to said steering wheel, power assist means provided on said housing at a location between said pair of cables extending from said follower pulley, as viewed in the axial direction of a rotary shaft of said follower pulley, and means for operating said power assist means in response to said steering torque detected by said means for detecting the steering torque inputted to said steering wheel.

2. A cable steering device according to claim 1, wherein said power assist means comprises a power steering motor having an output shaft, a bevel gear mounted on said output shaft of said power steering motor, and said bevel gear is meshed with a bevel gear mounted on one of said follower pulley and a rotary shaft of said follower pulley.

3. The cable steering device according to claim 1, wherein said power assist means has an output shaft which protrudes into said housing and is coupled to said rotary shaft of said follower pulley via mutually meshing gears within said housing.

4. A cable steering device for a vehicle, comprising:

a driven pulley connected to a steering wheel and capable of rotating, a gear box operative for turning vehicle wheels, a follower pulley connected to said gear box and capable of rotating, a housing for enclosing said follower pulley, a pair of cables connecting said driven pulley and said follower pulley together, said cables transmitting steering torque inputted to said steering wheel from said driven pulley to said follower pulley, a steering torque detecting device for detecting the steering torque inputted to said steering wheel, a power steering motor provided on said housing at a location between said pair of cables extending from said follower pulley as viewed in the axial direction of a rotary shaft of said follower pulley, and a control device for controlling the operation of said power steering motor in response to said steering torque detected by said steering torque detecting device.

5. The cable steering device according to claim 4, wherein said power assist means has an output shaft which protrudes into said housing and is coupled to said rotary shaft of said follower pulley via mutually meshing gears within said housing.

* * * * *